Patented Oct. 13, 1925.

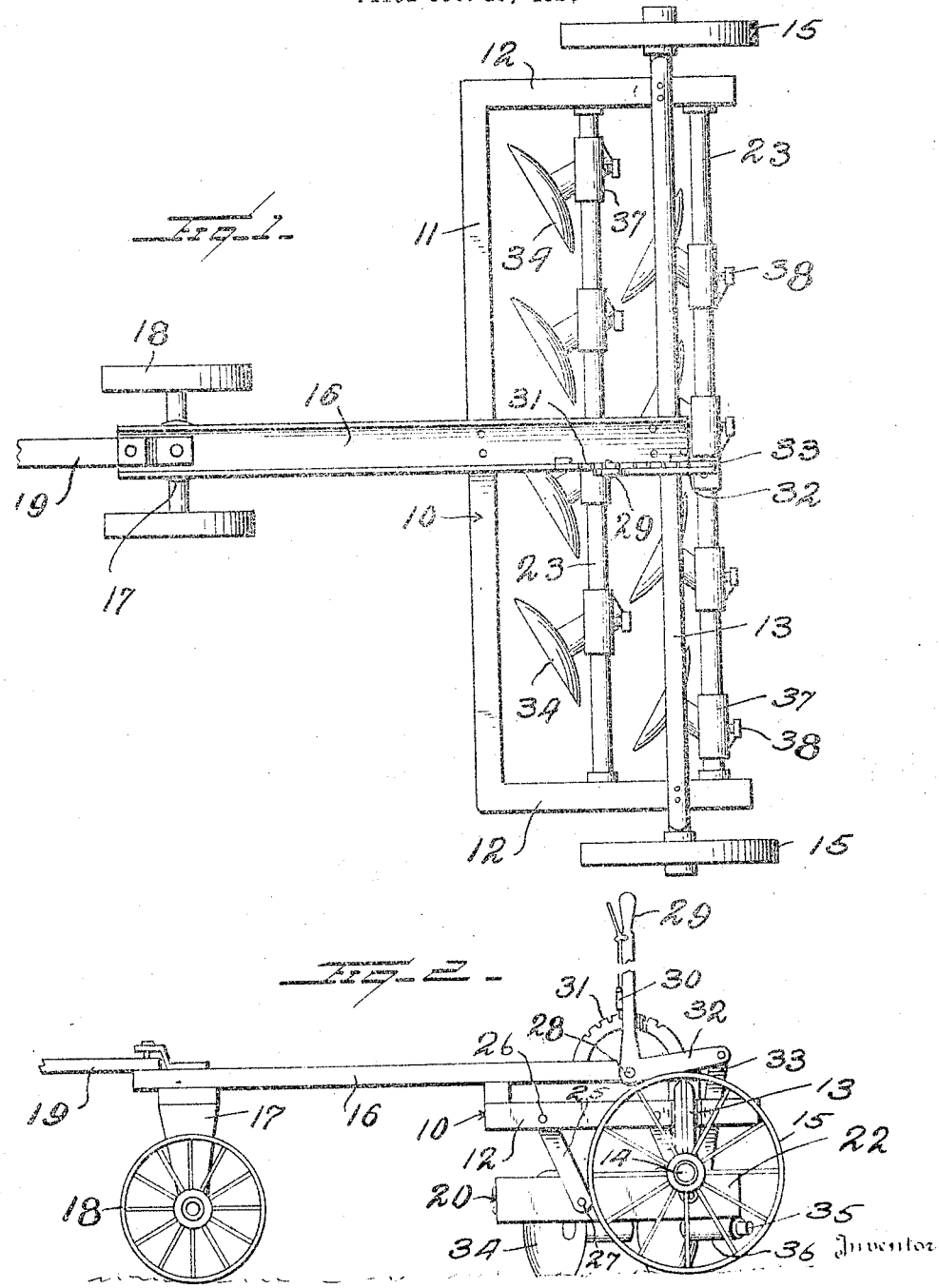

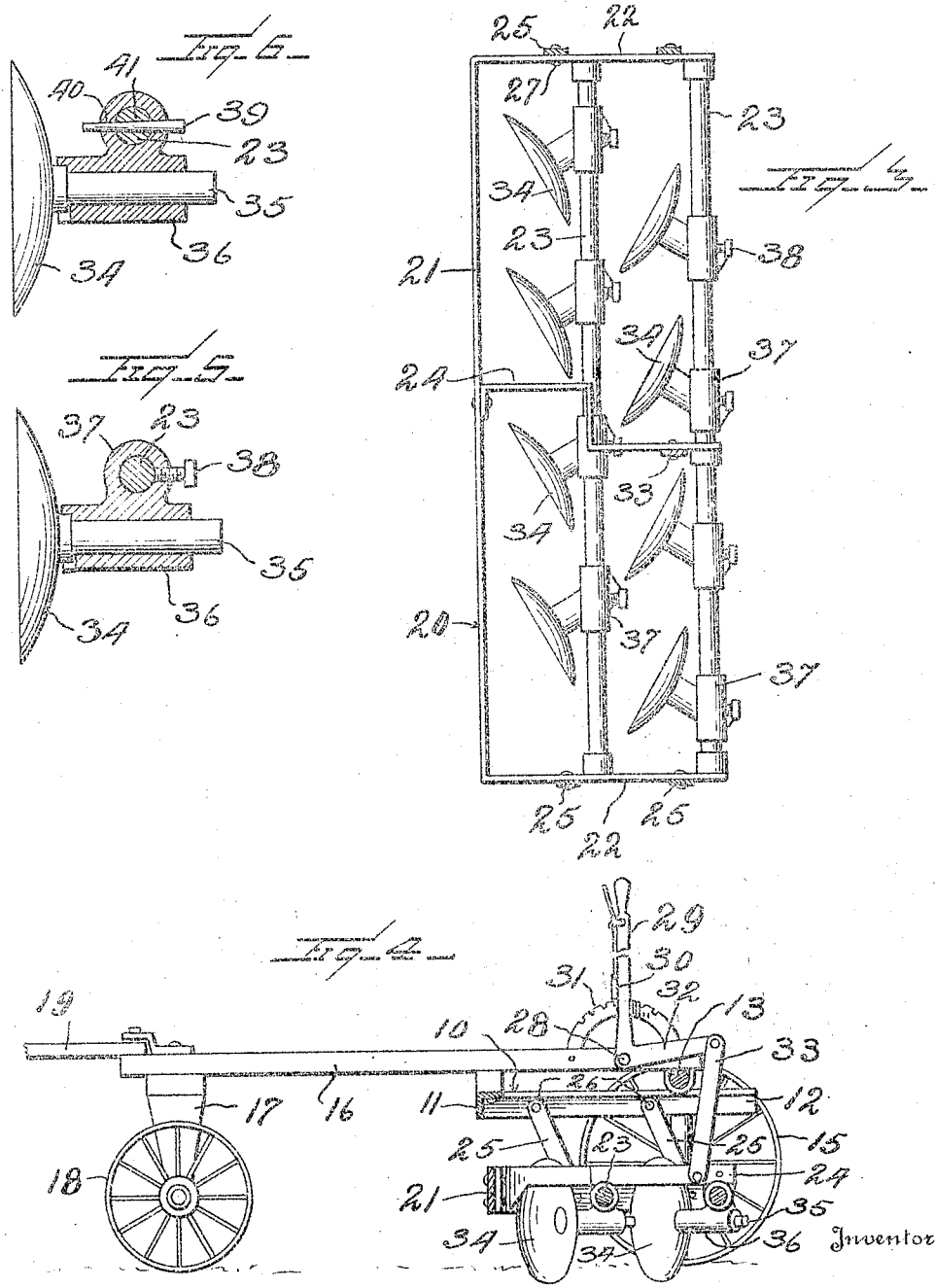

1,557,109

UNITED STATES PATENT OFFICE.

TEDDIE C. VANDEBERG, OF EPPING, NORTH DAKOTA.

DISK HARROW.

Application filed October 18, 1924. Serial No. 744,349.

*To all whom it may concern:*

Be it known that I, TEDDIE C. VANDEBERG, a citizen of the United States, residing at Epping, in the county of Williams and State of North Dakota, have invented certain new and useful Improvements in Disk Harrows, of which the following is a specification, reference being had to the accompanying drawings.

This invention relates to farm implements, particularly to harrows of the disk type, and has for its object the provision of a novel harrow employing a peculiar arrangement of disks so disposed and mounted as to dig up all of the surface traveled over and effectually destroy all weeds so that the ground will be left in proper condition for subsequent use.

An important and more specific object is to provide a novel mounting for the disks, the disks being, moreover, arranged in rows with those of one row staggered in relation to those of the preceding row whereby none of the portions of the surface will be skipped but all will be cut and broken up.

A further object is the provision of a harrow in which one row of disks will act to move the ground in one direction while the other row will act to move the ground in the opposite direction, a thorough breaking consequently resulting.

Yet another object is the provision of a novel mounting for the entire disk assembly equipped with lever actuating means for regulating the position of all of the disks and regulating their depth of penetration into the soil.

The invention further contemplates the provision of various detailed features of improvement and refinement whereby the device will be highly efficient in use, positive in action, durable in service, and a general improvement in the art.

With the above and other objects and advantages in view, the invention consists in the details of construction to be hereinafter more fully described and claimed, and illustrated in the accompanying drawings in which:

Figure 1 is a plan view of the device;
Figure 2 is a side elevation;
Figure 3 is a horizontal section looking down upon the disks;
Figure 4 is a cross section;
Figure 5 is a detailed view through the mounting for one disk; and Figure 6 is a similar view showing a modification.

Referring more particularly to the drawings, I have shown the device as comprising a main supporting frame 10 which may be angle or channel iron bars and of any desired size and shape though it is here represented as including a forward bar 11, rearwardly extending side bars 12, and an arch axle 13 secured to the rear portions of the side bars and having its ends formed with trunnions 14 on which are mounted ground engaging wheels 15. Secured to the central portion of the axle 13 and forward bar 11 is a tongue 16 on the under side of which is mounted a truck 17 equipped with wheels 18 and acting to guide the device and support the frame at a certain height above the ground. Any suitable draft device or draw bar 19 may be connected with the tongue so that the device may be pulled along by draft animals or by a tractor or the like.

Located beneath the main frame 10 is an auxiliary or movable frame 20 including a front bar 21, side bars 22, a pair of supporting bars 23, and a transverse bar member 24 connected with the bars 21 and 23. The specific form of this frame 20 and also of the frame 10 may be varied within wide limits and the details are given only for purposes of illustration to disclose a convenient arrangement.

In order that the frame 20 may be adjustably movably mounted with respect to the main frame 10, I have shown pairs of links 25 pivotally connected with the sides 12 of the main frame 10, as shown at 26, and pivoted at 27 to the side bars 22 of the movable frame 20. Pivoted at 28 on the tongue 16 is a lever 29 having a conventional grip released latch 30 co-operating with a notched segment 31 likewise mounted on the tongue, the lever having an angular arm 32 pivotally connected by a link 33 with the transverse bar 24 of the movable frame. Obviously, by changing the position of the lever 29, the frame 20 may be raised or lowered with respect to the main frame 10.

Carried by the supporting bars 23 are disks 34 arranged in rows as shown, each disk having a stub shaft 35 journaled through a dust-proof bearing 36 on a sleeve member 37 secured to the bar 23. All the sleeve members 37 are of the same construction but it will be observed that the bearings 36 on the sleeves carried by the forwardmost bar 23 incline laterally in one direction while the bearings on the sleeves carried by the rearmost bar 23 are inclined laterally in the opposite direction so that the front row of disks will face slightly toward one side of the machine with the rear row of disks facing toward the opposite side. The bearings and disks are arranged in staggered relation so that the disks of the rear row will be located opposite or behind the spaces between the disks in the forward row as clearly indicated. It is advisable that means be provided for adjusting the disks and for this reason I have shown the sleeve members 37 as held in place by set screws 38 or the like so that the sleeves may be adjusted longitudinally of their supporting bars 23 and so that they may be rotatably adjusted thereon, thus varying the positions of the disks with respect to one another and with respect to the surface traveled over, depending on different conditions or circumstances.

Instead of using set screws 38, I may make use of wooden pins 39 engaging through holes 40 in the members 37 and through holes 41 in the members 23, as shown in Figure 6, the advantage being that in case the disks hit obstructions the pins will break and prevent damage to the parts.

In the operation, it is apparent that when the device is drawn along a field the disks will dig into the ground and effectually break it up as is necessary for a proper preparation for seeding. Owing to the fact that the disks are inclined it is evident that they will rotate on account of the drag against them and it is clear that they will cut the roots of and dig up weeds and other vegetation. As the rear disks are located behind the spaces between the forward disks, all portions of the soil will be treated. Another feature of advantage is that the opposite inclination of the disks of the two rows will not only insure a thorough crushing, crumbling and cutting of the soil but will also avoid side draft. The depth of penetration of the disks is regulated by adjusting the lever 29 as above described.

From the foregoing description and a study of the drawings it will be seen that I have provided a simple and comparatively inexpensive device for the purpose specified which will efficiently perform all the functions for which it is intended. Owing to the comparative fewness of the parts and ruggedness of the construction it is obvious that the device should be very durable and consequently have a long and satisfactory life.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. In a harrow, a frame, spaced supporting members mounted in and forming part of the frame, slidable sleeve members mounted on said supporting members and including bearings, and disks having stub shafts engaged through said bearings, the bearings on the sleeves carried by one supporting member being inclined forwardly and laterally in one direction and the bearings on the sleeves carried by the other member being inclined forwardly and laterally in the other direction, the sleeves being adjustable longitudinally along their supporting members.

2. In a harrow, a frame, spaced supporting members mounted in and forming part of the frame, slidable sleeve members mounted on said supporting members and including bearings, and disks having stub shafts engaged through said bearings, the bearings on the sleeves carried by one supporting member being inclined forwardly and laterally in one direction and the bearings on the sleeves carried by the other member being inclined forwardly and laterally in the other direction, said sleeves being adjustable rotatably upon their supporting members for varying the angles of the disks with respect to one another and with respect to the surface traveled over.

In testimony whereof I hereunto affix my signature.

TEDDIE C. VANDEBERG.